(12) United States Patent
Hors et al.

(10) Patent No.: US 7,669,805 B2
(45) Date of Patent: Mar. 2, 2010

(54) DEVICE FOR REMOTELY CONTROLLING AIRCRAFT CONTROL SURFACES

(75) Inventors: Daniel Hors, Puteaux (FR); Yvon Joncour, Osny (FR)

(73) Assignee: Sagem Defense Securite, Paris (FR)

( * ) Notice: Subject to any disclaimer, the term of this patent is extended or adjusted under 35 U.S.C. 154(b) by 682 days.

(21) Appl. No.: 11/631,060

(22) PCT Filed: Jun. 27, 2005

(86) PCT No.: PCT/FR2005/001620
§ 371 (c)(1),
(2), (4) Date: Dec. 28, 2006

(87) PCT Pub. No.: WO2006/010841
PCT Pub. Date: Feb. 2, 2006

(65) Prior Publication Data
US 2009/0189024 A1   Jul. 30, 2009

(30) Foreign Application Priority Data
Jun. 29, 2004   (FR) .................................. 04 07167

(51) Int. Cl.
*B64C 13/04* (2006.01)
(52) U.S. Cl. .................... 244/221; 244/223; 244/99.3
(58) Field of Classification Search ............... 244/221, 244/223, 99.3, 222, 220, 232, 234, 99.2; 74/471 R, 469
See application file for complete search history.

(56) References Cited

U.S. PATENT DOCUMENTS

| | | | | |
|---|---|---|---|---|
| 2,394,384 A | | 2/1946 | Horstmann | |
| 2,695,145 A | * | 11/1954 | Lear et al. | 244/223 |
| 3,747,876 A | * | 7/1973 | Fortna et al. | 244/223 |
| 3,750,984 A | * | 8/1973 | Mouttet et al. | 244/76 R |
| 4,069,720 A | | 1/1978 | Thor et al. | |
| 4,477,043 A | * | 10/1984 | Repperger | 244/223 |
| 4,477,044 A | * | 10/1984 | Darcy et al. | 244/223 |
| 5,125,602 A | * | 6/1992 | Vauvelle | 244/223 |
| 5,156,363 A | * | 10/1992 | Cizewski et al. | 244/223 |
| 5,513,543 A | | 5/1996 | Carlson et al. | |
| 5,538,209 A | * | 7/1996 | Bowden et al. | 244/221 |
| 5,911,390 A | * | 6/1999 | Pohling | 244/223 |

FOREIGN PATENT DOCUMENTS

EP    0659640    6/1995

* cited by examiner

*Primary Examiner*—Christopher P Ellis
(74) *Attorney, Agent, or Firm*—McDonnell Boehnen Hulbert & Berghoff LLP

(57) ABSTRACT

A device for remotely controlling the control surfaces of an aircraft, the device comprising: an actuator member pivotable about an axis and entraining a rotary shaft; a stationary finger parallel to the shaft and supported at a radial distance from the shaft; a moving finger secured to the shaft and supported at a radial distance therefrom, both fingers being parallel to the shaft; a first slab supported at a radial distance from the shaft beside the two fingers on one side thereof and suitable for turning about the axis of the shaft; a second slab supported at a radial distance from the shaft beside the two fingers on their side opposite from the first slab, and suitable for turning about the axis of the shaft; a third slab supported at a radial distance from the shaft beside the second slab at an angular distance therefrom and suitable for turning about the axis of the shaft; a first spring between the first and second slabs; and a second spring between the first and third slabs.

9 Claims, 5 Drawing Sheets

US 7,669,805 B2

DEVICE FOR REMOTELY CONTROLLING AIRCRAFT CONTROL SURFACES

This application is a National Stage of International Application No. PCT/FR2005/001620, filed Jun. 27, 2005, which claims priority to French Application No. FR 0407167, filed Jun. 29, 2004.

FIELD OF THE INVENTION

The present invention relates to the field of remotely controlling control surfaces of an aircraft, such as an airplane, a helicopter, . . . , and the invention relates more specifically to improvements applied to such devices, commonly referred to as control columns or sticks, provided for controlling the roll (banking) control surfaces and/or the pitch (elevator) control surfaces; more specifically, the invention relates to improvements applying more particularly, although not exclusively, to devices in which the stick is of small size (mini-stick) and is structurally associated with an armrest so as to capable of being actuated with the arm resting on the armrest, merely by moving only the wrist.

BACKGROUND OF THE INVENTION

A control device of the type to which the invention relates comprises an actuator member (knob, pedal) suitable for pivoting about an axis on either side of a neutral position and for controlling a modification to the flying surfaces of the aircraft in terms of roll and/or pitch, and for this purpose it is capable of pivoting about two main axes that are perpendicular (Cardan joint type mount). Mechanical or hydraulic type control systems act in a structurally intrinsic manner to generate opposing forces that are perceived by the pilot on moving the stick. In contrast, in electrical or electronic control systems, no opposing force is generated naturally and it is necessary to add an auxiliary device associated with the main control specifically for generating an opposing force that can be perceived by the user, as a function of the angular displacement of the actuator member.

In some circumstances, it is necessary to make provision for the opposing force to differ in magnitude as a function of the position of the actuator member; for example, it can be desirable for the opposing force to be proportional to the angular offset of the actuator member over a major fraction of its stroke, but with an opposing force that becomes greater in the vicinity of the end of the stroke so that the pilot can "feel" the approaching end of the stroke. Such a control with opposing force that varies in stages can find a particular application in controlling pitch control surfaces. It may also be desirable to have, in addition, forces that are unequal depending on the direction in which the actuator member is displaced.

SUMMARY OF THE INVENTION

An object of the invention is to provide an improved device that is better adapted, and in particular more compact, than present devices to response curves that are diverse and/or asymmetrical, these improvements finding an application that is preferred although not exclusive in mini-sticks for pilots, and in particular for controlling pitch control surfaces.

To these ends, the invention provides a device for remotely controlling aircraft control surfaces, said device comprising an actuator member capable of pivoting about an axis while entraining a rotary shaft on said axis, that, when arranged in accordance with the invention, is characterized in that it comprises:

a stationary, first finger parallel to said shaft and supported at a radial distance from said shaft;

a second finger secured to said rotary shaft and parallel thereto and supported at a radial distance therefrom;

a first slab supported at a radial distance from said shaft and extending beside the two fingers on one side thereof and in such a manner as to be capable of turning about the axis of the shaft;

a second slab supported at a radial distance from said shaft and extending beside the two fingers on the side thereof opposite from the first slab and in such a manner as to be capable of turning about the axis of the shaft;

at least one third slab supported at a radial distance from said shaft and extending beside the second slab and at an angular distance therefrom, and in such a manner as to be capable of turning about the axis of the shaft;

a first spring interposed between the first and second slabs; and a second spring interposed between the first and third slabs.

By means of this arrangement, the device can occupy a plurality of functional positions, i.e.:

a neutral position occupied in the absence of any force being exerted on the actuator member, in which the moving finger is in alignment with the stationary finger, the first and second slabs are held pressed laterally against the two fingers in alignment and on either side thereof under the action of the first spring, and the third slab is held spaced apart from the second slab, the second spring not being prestressed;

a position pivoted in a first direction from the neutral position through a variable angle for which the moving, second finger is entrained relative to the stationary, first finger on the side of the second slab, thereby entraining it, and being subjected to the return force from the first spring interposed between said first and second slabs, and then pivoted still in the same direction through a variable angle with the second slab touching the third slab and thereby entraining it, and being subjected to the additional return force from the second spring; and a position pivoted in a second direction opposite to the preceding direction, away from the neutral position through a variable angle in which the moving, second finger is entrained relative to the stationary, first finger on the side of the first slab, thereby entraining it, and being subjected to the return force of the first spring interposed between the first and second slabs, and then pivoted still in the same direction through a variable angle with the third slab touching the second slab and being subjected to the combined return forces of the first and second springs.

Thus, the dispositions in accordance with the invention enable the operator to sense physically when the actuator member is coming into predetermined angular positions, and the number of thresholds that can be detected in this way can be made arbitrary by providing an appropriate number of slabs associated with return springs.

In practice, in order to make a device that is more compact, it is advantageous for both springs to be torsion springs, in particular helical springs, which are disposed coaxially about the shaft. Still in order to make a device that is compact, it can be advantageous for one of the two helical springs to be inside the other.

If it is desired to have an opposing force that is asymmetrical depending on the displacement direction of the actuator member, provision can be made, over the first displacement range of the actuator member, for the first spring to be made up of two springs in series, one being interposed between the stationary finger and the first slab and the other being interposed between the stationary finger and the second slab, with the two springs in series having different respective stiffnesses.

As can be seen from the above, the dispositions in accordance with the invention as set out find an advantageous application when the actuator member is a manually-actuatable knob or stick, most particularly of the so-called mini-stick type, and in particular when it is functionally associated with controlling pitch control surfaces.

The structure of the device in accordance with the invention also provides the additional advantage of enabling the actuator member to operate actively by applying motor drive to the stationary finger so that in an automatic pilot mode, the control member follows the maneuvers of the aircraft as controlled by a computer or by the pilot (when the actuator member is a co-pilot's control member and not in use). To this end, provision is made for the device to include motor-driven displacement means functionally associated with the stationary finger and suitable for modifying the position of the stationary finger.

BRIEF DESCRIPTION OF THE DRAWINGS

The invention can be better understood on reading the following detailed description of certain preferred embodiments given solely as non-limiting examples. In the description, reference is made to the accompanying drawings, in which.

DESCRIPTION OF THE INVENTION

Figure 1:
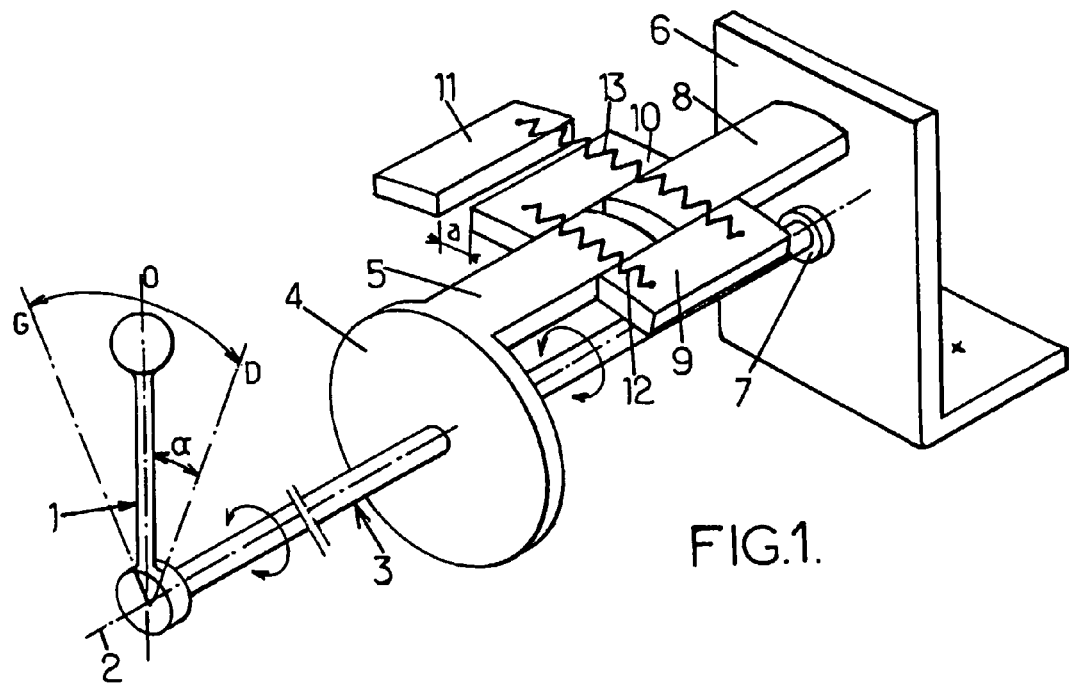
FIG. 1 is a highly diagrammatic perspective view of a device arranged in accordance with the invention.
Figure 2:
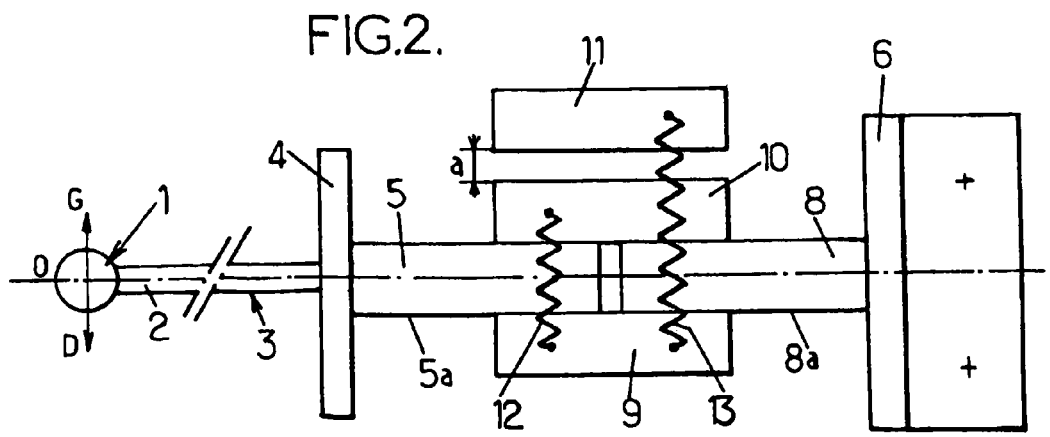
FIG. 2 is a plan view of the FIG. 1 device shown in a first functional position.

FIGS. 1 and 2 are referred to initially and show in highly diagrammatic manner the component elements of a base structure for a remote control device arranged in accordance with the invention. Nevertheless, it should be specified at this point that the remote control portion proper does not come within the field of the invention and is therefore not shown, and that only those elements or portions with which the invention is concerned are shown, i.e. the elements or portions suitable for restoring force when the operator (the pilot of the aircraft) moves the joystick angularly in order to act on deflecting the aircraft flying surfaces, on the assumption that the control does not present its own opposing force (as applies to an electrical control, for example).

Under such conditions, the pilot has available a control column or stick 1 which, in a preferred application of the invention, is of the "mini"-stick type suitable for being actuated while the pilot's forearm is resting on an armrest (not shown) having the stick 1 mounted in its immediate vicinity. The stick 1 can be pivoted about an axis 2, thereby driving a shaft 3 on said axis 2. The shaft 3 remotely controls in any suitable manner known to the person skilled in the art the movement of pitch-control elements of the flying surfaces. The same shaft 3, or another shaft constrained to rotate therewith (e.g. via a gear coupling), is secured to an end plate 4 on the same axis carrying, e.g. at its periphery or in the vicinity of its periphery, a drive finger 5 parallel to the shaft 3 and held at a radial distance therefrom.

A stationary frame portion, shown as a stationary end plate 6, supports the end of the shaft 3 in a bearing 7 and also supports a stationary finger 8 that extends parallel to the shaft 3. In the preferred embodiment shown in FIGS. 1 and 2, the finger 8 is situated in register with and in line with the moving finger 5 when the device is in its neutral position shown in FIG. 1, and as described in greater detail below.

A first slab 9 is supported at a radial distance from the said shaft 3, being situated beside the two fingers 5 and 8 on one side thereof and extending so as to overlap both of them, and it is also supported in such a manner as to be capable of turning about the axis of the shaft 3. In the position shown in FIG. 1, the slab 9 has its edge facing towards the facing edges of the two fingers 5 and 8 shaped suitably for contacting said edges of the fingers. In a simple embodiment, the edges of the two fingers 5 and 8 that face towards the slab 9 are in mutual alignment, such that the corresponding edge of the slab 9 is substantially straight. The slab 9 may be supported in any desirable manner (slideways, rotary arm hinged on the shaft 3, . . . ) so as to be capable of turning about the shaft 3 at a distance therefrom.

A second slab 10 is supported at a radial distance form said shaft 3 and also extends beside the two fingers 8 and 5, but on the opposite side thereof relative to the first slab 9, and in such a manner as to be capable of turning about the axis of the shaft 3. In practice, the second slab 10 can be analogous to the first slab 9, and can be arranged and mounted in the same manner as the first slab 9, but on the other side of the fingers 5 and 8.

A third slab 11 is supported at a radial distance from said shaft 3 being disposed beside the second slab 10 on its side opposite from the fingers 5 and 8, and in the rest position as shown in FIG. 1 it is spaced apart from the second slab by a predetermined angular distance a. The third slab 11 is also supported so as to be capable of turning about the axis of the shaft 3.

A first return spring 12 is secured to the first and second slabs 9 and 10, and a second return spring 13 is secured to the first and third slabs 9 and 11 (in FIGS. 1 and 2, the two return springs 12 and 13 are shown diagrammatically, each in the form of a helical spring extending transversely).

In the absence of any force being exerted on the stick 1, the device occupies its rest position or neutral position referenced O as shown in FIGS. 1 and 2. In this position, the first spring 12 is prestressed so as to urge the first and second slabs towards each other, so that they press against the fingers 5 and 8 on either side thereof. In contrast, the second spring 13 is not prestressed so that the third slab 11 remains transversely offset from the second slab 10 by an angular distance a.

Figure 2A:
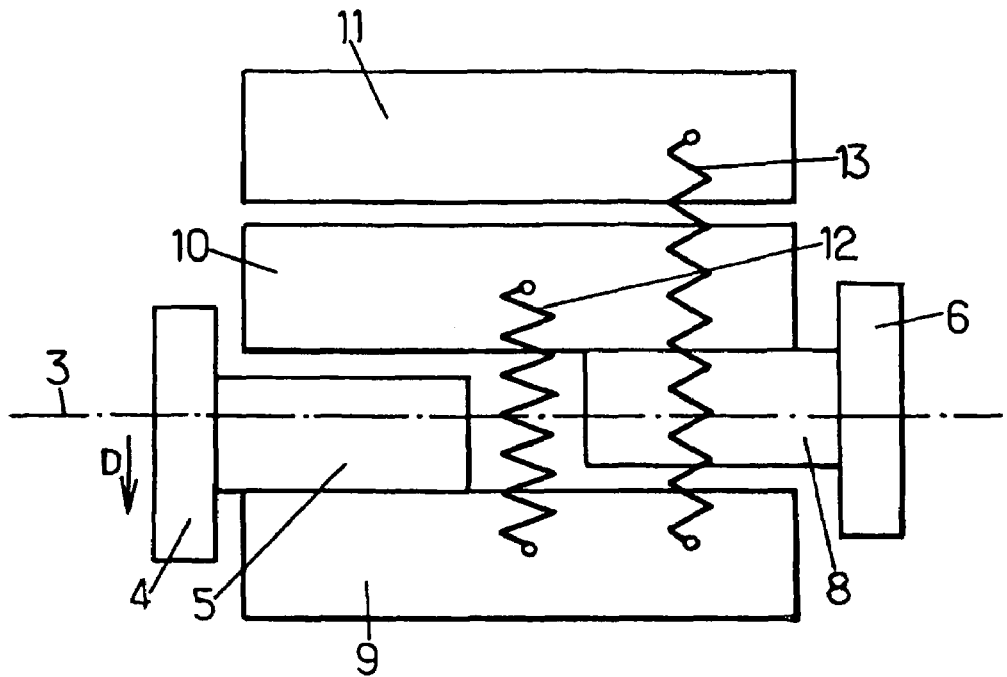
FIGS. 2A and 2B are simplified views analogous to that of FIG. 2, showing respectively two other functional positions obtained for two displacements in the same direction of the actuator member.
Figure 2B:
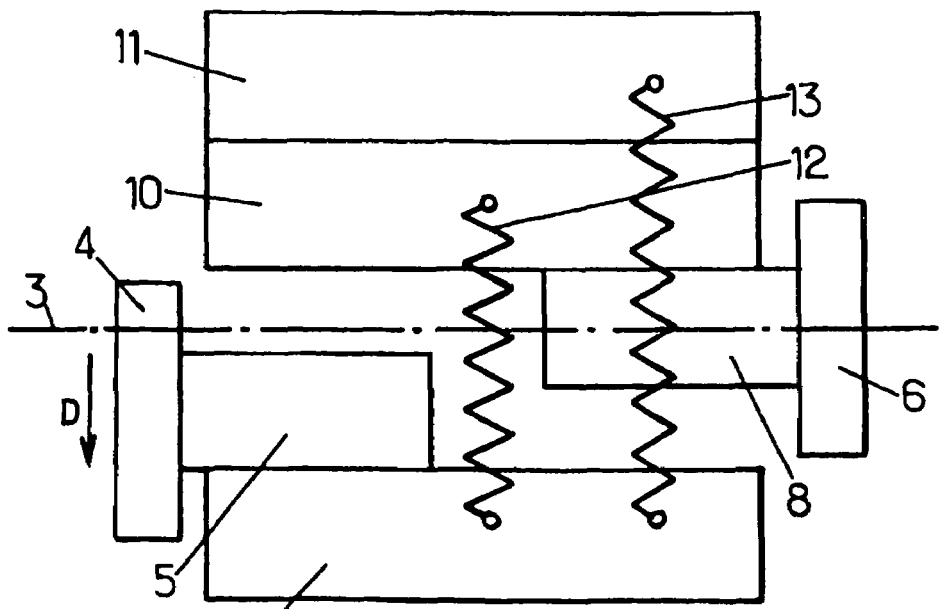

If the stick 1 is deflected (e.g. towards the right, D in FIGS. 1, 2, 2A, and 2B) through an angle α that is less than the above-mentioned angular offset a, then the moving finger 5 secured to the end plate 4, itself secured to the shaft 3, is moved transversely relative to the axis 2; it entrains the first slab 9, moving it away from the stationary finger 8 against the return force of the first spring 12, while the second slab 10 is held in contact with the stationary finger 8 (FIG. 2A). Simultaneously, the first slab 9 entrains the third slab 11 by means of the spring 10, but since the spring is not prestressed, the movement of the third slab 11 takes place without changing the transverse spacing between the first and third slabs 9 and 11, as shown in FIG. 2A.

In contrast, with the movement of the first slab 9 continuing under drive from the finger 5 (the angle α becoming greater than the offset a), the third slab 11 ends up coming into contact with the second slab 10 and remains in abutment thereagainst. At this moment, the second spring 13 begins to be stretched and further displacement of the first slab 9 is performed against the combined return forces of both springs 12 and 13.

Figure 2C:
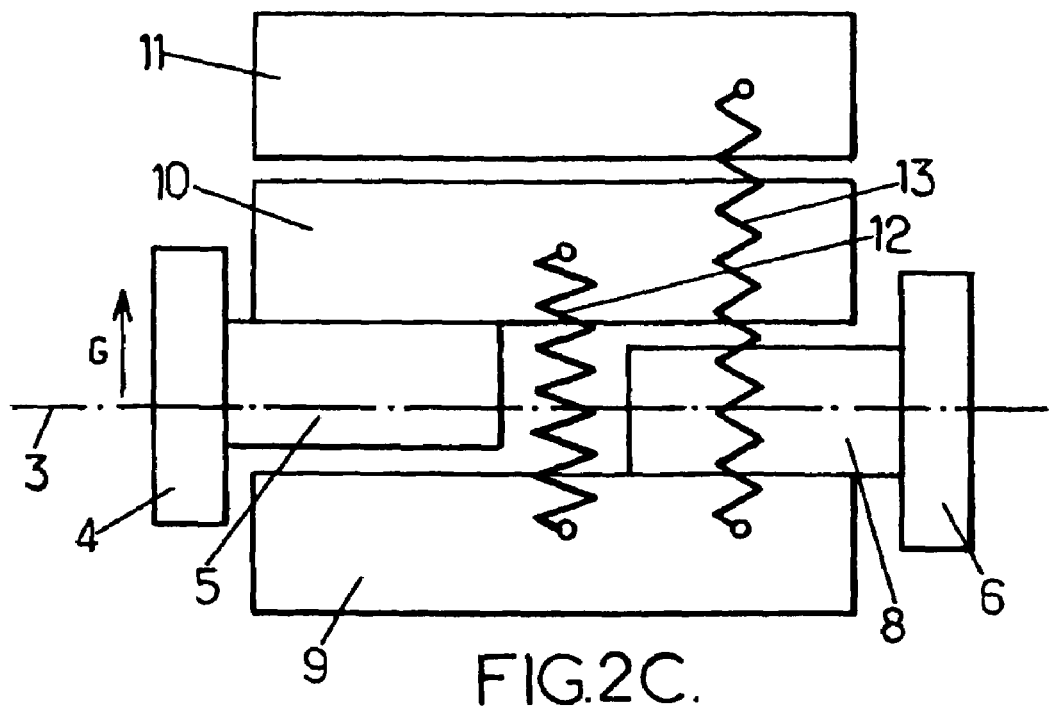
FIGS. 2C and 2D are simplified views analogous to that of FIG. 2, also showing two other functional positions obtained for two displacements in the same direction of the actuator member, and opposite in direction to the displacement of FIGS. 2A and 2B.
Figure 2D:
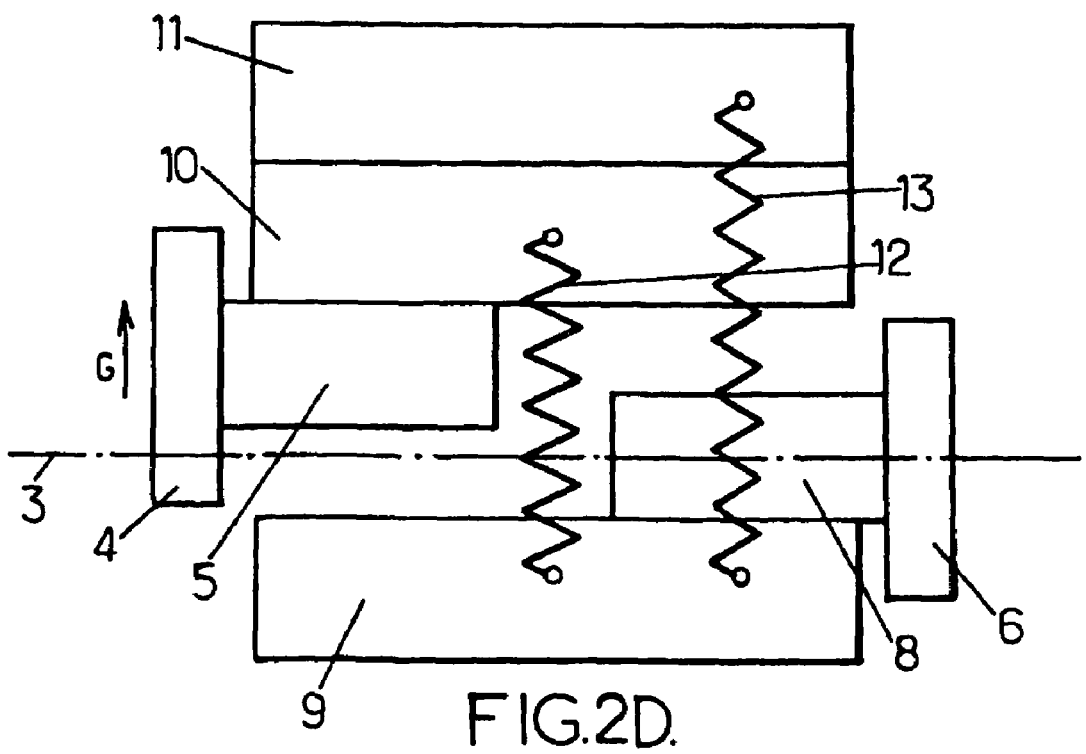

If the stick 1 is now deflected the other way (towards the left, G in FIGS. 1, 2, 2C, and 2D) through an angle α less than the offset a, the moving finger 5 is moved by the end plate 4 without entraining the first slab 9, which remains blocked against the stationary finger 8, but entraining the second slab 10 against the return force of the first spring 12 so long as the amplitude traveled by the finger 5 remains less than a (FIG. 2C); at the moment the second slab 10 comes into contact with the third slab 11, and thereafter (α>a), the finger 5 entrains both the second and the third slabs 10 and 11 against the combined return forces of the first and second springs 12 and 13.

Figure 4A:
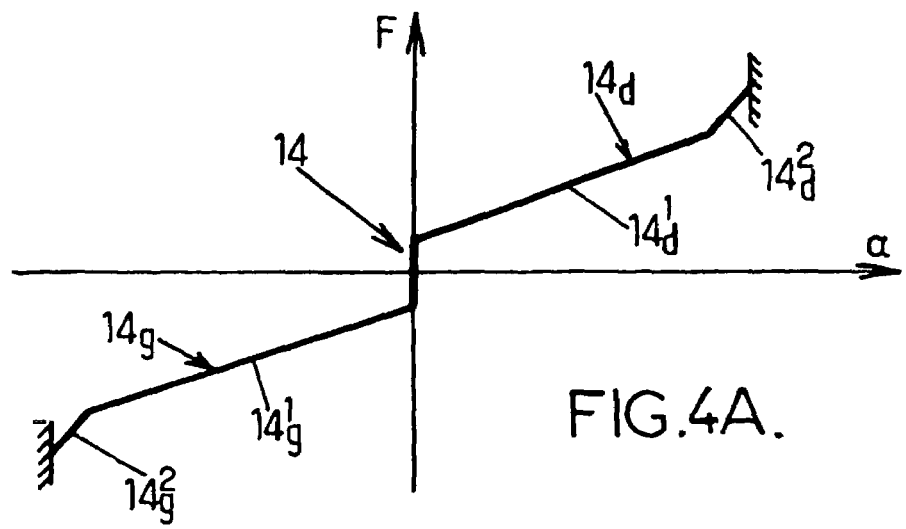
FIGS. 4A and 4B are graphs plotting response curves of the kind that can be obtained with various embodiments of devices in accordance with the invention.

Finally, the response curve 14 for this arrangement is of the kind shown in FIG. 4A (forces plotted up the ordinate and angular displacement α of the stick 1 plotted along the abscissa). The response curve 14 is symmetrical about the origin P and each half-curve $14_d$ and $14_g$ presents two straight line segments $14^1$ and $14^2$ having different slopes corresponding respectively to the return force from the first spring 10 on its own and to the combined return forces from the first and second springs 11 and 13.

In FIGS. 2A to 2D (and also below in FIG. 5), angular displacements of the moving finger 5 and of the slabs 9 to 11 are represented as linear displacements.

An application for which the device in accordance with the invention as described above is most particularly, although not exclusively, intended lies with controlling the pitch of an aircraft flying surfaces using a stick of the "mini-stick" type, with said control being obtained by moving the mini-stick angularly in an approximately vertical plane extending substantially transversely relative to the axis 2, i.e. from left to right or vice versa as shown in FIGS. 1 and 2. With a mini-stick, the forearm rests on an armrest and the above-mentioned pivoting movements of the mini-stick are obtained by front to back or back to front movements of the wrist.

Figure 4B:
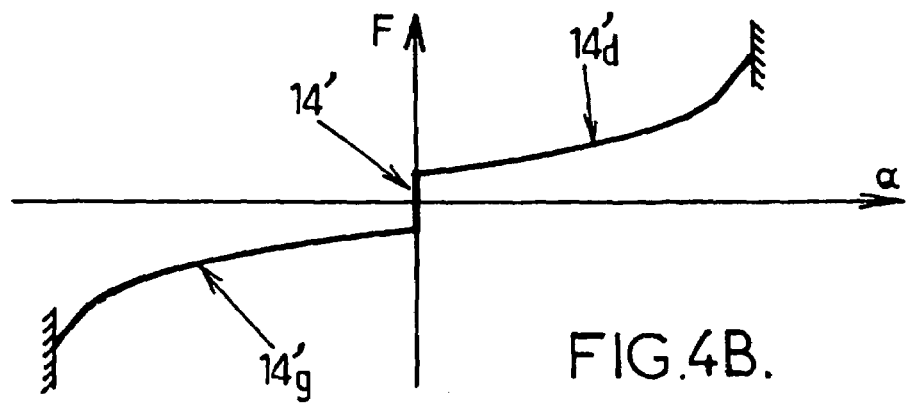

It will be understood that the arrangement in accordance with the invention makes it possible to obtain response curves of any desired shape, i.e. not only response curves having rectilinear segments as shown in FIG. 4A, but also, if so desired for specific applications, response curves having multiple segments, by increasing the number of slabs beyond the third slab 11, or response curves presenting at least in part curvilinear variations as shown in FIG. 4B where the response curve 14' has each of its half-curves $14_d{'}$ and $14_g{'}$ including a curved portion followed by a segment that is rectilinear or possibly likewise curved. The person skilled in the art knows how to obtain such response curves by structurally assembling springs having different stiffnesses, by using springs with characteristics that are not constant, . . . .

Figure 5:
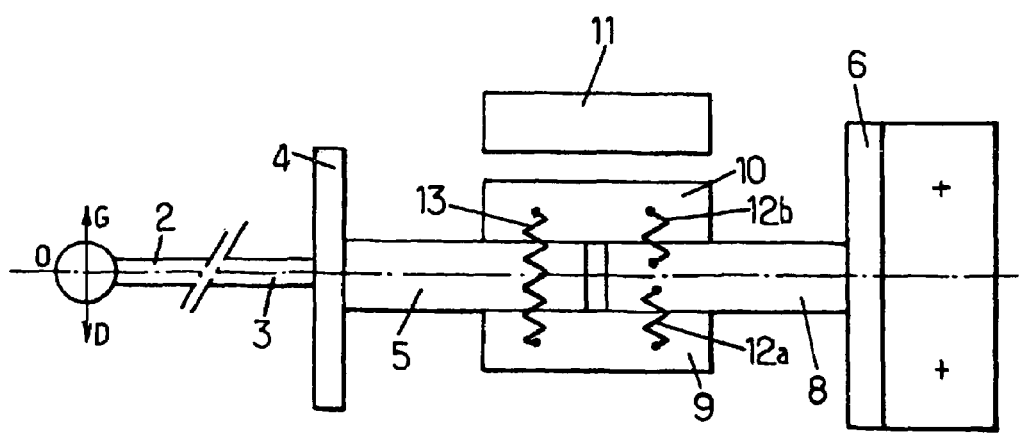
FIG. 5 is a plan view analogous to that of FIG. 2, showing a possible variant embodiment of the device of the invention.
Figure 6:
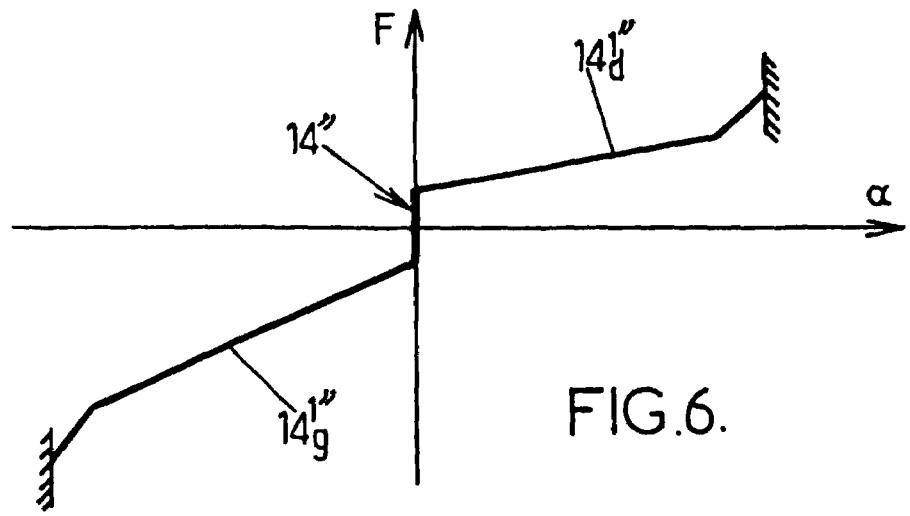
FIG. 6 is a graph plotting the response curves that can be obtained with the FIG. 5 device.

An asymmetrical response curve can be obtained, if so desired, by making the device of FIGS. 1 and 2 asymmetrical concerning the return force developed by the first spring 12. For this purpose, and as shown in FIG. 5, the first spring 12 is subdivided into two springs, namely a spring 12a interposed between the first slab 9 and the stationary finger 8, and a spring 12b interposed between the second slab 10 and the stationary finger 8, the two springs 12a and 12b having different stiffnesses. The operation of the device remains analogous to that explained above, except that the opposing force encountered while displacing the stick 1 differs depending on the direction of displacement on either side of the neutral position O. The corresponding response curve 14" is then as shown in FIG. 6, with segments $14_g^{1}{''}$ and $14_d^{1}{''}$ presenting different slopes.

In a preferred embodiment of the invention, the springs 12 and 13 are made in the form of torsion springs, advantageously in the form of helical springs coaxially surrounding the shaft 3. In addition, in order to constitute an assembly that is compact, it is advantageous to ensure that one of the helical springs lies inside the other.

Figure 3:
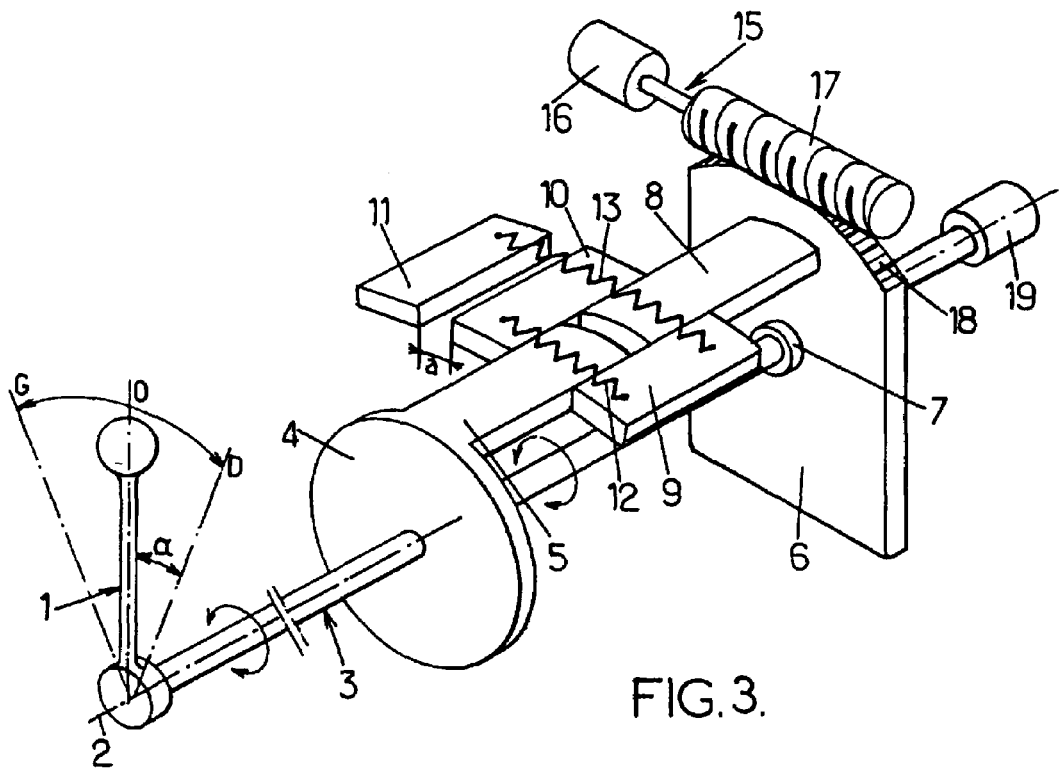
FIG. 3 is a view analogous to that of FIG. 1 showing a variant embodiment that is motor-driven.

The above-described arrangement for the device in accordance with the invention makes it possible to envisage a motor-driven version that is safe. Direct motor drive applied to the actuator member 1 might turn out to be unsatisfactory since it would need to be capable of overcoming the prestress forces of the springs, and it would also not be safe in the event of an motor breakdown of the type in which the motor operates in random manner. Nevertheless, an advantageous solution consists in moving the neutral position reference, in other words in applying motor drive to the position reference finger 8. For this purpose, and as shown in FIG. 3, it is possible to envisage constituting the end plate 6 in movable manner, i.e. capable of pivoting about the shaft 3. One embodiment, as shown in FIG. 3, can consist in providing displacement means 15 for moving the end plate 6, which displacement means 15 may comprise a motor 16 driving a wormscrew 17 that meshes with a toothed edge 18 of the end plate 6 that is secured to the finger 8, the edge being rounded about the axis of the shaft 3. It is desirable for an angular position sensor 19 functionally associated with the shaft 3 (e.g. angularly secured thereto) to be included in an angle-indicator circuit.

By moving the position reference, such an arrangement with a motor-driven finger 8 serves to activate the actuator member 1 and thus enables said member 1 to be functionally active in an automatic pilot mode (or as a second stick, not in use), being capable of following the maneuvers of an aircraft whether controlled by a computer or a pilot (a co-pilot stick). Such a structure is safe in the sense that in the event of a motor breakdown of the type in which the motor operates randomly, it is possible to take over due to the spring force relationship, and the pilot can counter the unwanted movements due to the motor.

It can clearly be seen from the above description that in the preferred application of the device in accordance with the invention, the actuator member is a manually-operable stick or knob 1, in particular of the mini-stick type that can be moved backwards or forwards by the wrist from a central neutral position for controlling the pitch control surfaces of the aircraft's flying surfaces. Naturally, such a device could be used for performing other kinds of control, for example for controlling roll control surfaces of an aircraft's flying surfaces.

The invention claimed is:

1. A device for remotely controlling control surfaces of an aircraft, said device comprising an actuator member suitable for pivoting about one axis to drive a rotary shaft comprising:
- a stationary, first finger parallel to said shaft and supported at a radial distance from said shaft;
- a second finger secured to said rotary shaft and parallel thereto and supported at a radial distance therefrom;
- a first slab supported at a radial distance from said shaft and extending beside the two fingers on one side thereof and in such a manner as to be capable of turning about the axis of the shaft;
- a second slab supported at a radial distance from said shaft and extending beside the two fingers on the side thereof opposite from the first slab and in such a manner as to be capable of turning about the axis of the shaft;
- at least one third slab supported at a radial distance from said shaft and extending beside the second slab and at an angular distance (a) therefrom, and in such a manner as to be capable of turning about the axis of the shaft;
- a first spring interposed between the first and second slabs; and
- a second spring interposed between the first and third slabs;

whereby the device can occupy a plurality of functional positions, namely:
- a neutral position occupied in the absence of any force being exerted on the actuator member, in which the moving finger is in alignment with the stationary finger, the first and second slabs are held pressed laterally against the two fingers in alignment and on either side thereof under the action of the first spring, and the third slab is held spaced apart from the second slab, the second spring not being prestressed;
- a position pivoted in a first direction from the neutral position through a variable angle for which the moving, second finger is entrained relative to the stationary, first finger on the side of the second slab, thereby entraining it, and being subjected to the return force from the first spring interposed between said first and second slabs, and then pivoted still in the same direction through a variable angle with the second slab touching the third slab and thereby entraining it, and being subjected to the additional return force from the second spring; and
- a position pivoted in a second direction opposite to the preceding direction, away from the neutral position through a variable angle in which the moving, second finger is entrained relative to the stationary, first finger on the side of the first slab, thereby entraining it, and being subjected to the return force of the first spring interposed between the first and second slabs, and then pivoted still in the same direction through a variable angle with the third slab touching the second slab and being subjected to the combined return forces of the first and second springs.

2. A device according to claim 1, wherein both springs are torsion springs disposed coaxially about the shaft.

3. A device according to claim 2, wherein both springs are helical springs.

4. A device according to claim 3, wherein both springs are helical springs and wherein one of the two helical springs is inside the other.

5. A device according to claim 1, wherein the first spring is made up of two springs in series, one of them being interposed between the stationary finger and the first slab, and the other one of them being interposed between the stationary finger and the second slab, and wherein the two springs in series have different respective stiffnesses, whereby an opposing force is different depending on a displacement direction of the actuator member.

6. A device according to claim 1, wherein the actuator member is a manually-operable stick or knob.

7. A device according to claim 6, wherein the actuator member is of the so-called mini-stick type.

8. A device according to claim 1, further comprising motor-driven displacement means functionally associated with the stationary finger and suitable for modifying the position of the stationary finger.

9. A device according claim 1, wherein the device is functionally associated with controlling pitch-control surfaces of the wing of the aircraft.

* * * * *